(12) United States Patent
Maeda et al.

(10) Patent No.: US 6,421,772 B1
(45) Date of Patent: *Jul. 16, 2002

(54) PARALLEL COMPUTER WITH IMPROVED ACCESS TO ADJACENT PROCESSOR AND MEMORY ELEMENTS

(75) Inventors: Kenichi Maeda; Nobuyuki Takeda, both of Kobe; Yasukazu Okamoto, Akashi, all of (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/325,046

(22) Filed: Jun. 3, 1999

(30) Foreign Application Priority Data

Jun. 4, 1998 (JP) .......................................... 10-155948

(51) Int. Cl.$^7$ ............................................... G06F 15/76
(52) U.S. Cl. .......................................... 712/11; 712/16
(58) Field of Search .................... 712/11, 13, 15, 712/19, 22, 16; 382/325

(56) References Cited

U.S. PATENT DOCUMENTS

| | | | | |
|---|---|---|---|---|
| 4,466,064 A | * | 8/1984 | Martin | 712/13 |
| 4,720,780 A | * | 1/1988 | Dolecek | 712/18 |
| 4,942,517 A | * | 7/1990 | Cok | 712/11 |
| 4,976,096 A | * | 12/1990 | Ueda et al. | 709/248 |
| 5,038,386 A | * | 8/1991 | Li | 712/11 |
| 5,226,125 A | * | 7/1993 | Balmer et al. | 710/132 |
| 5,410,649 A | * | 4/1995 | Gove | 395/161 |
| 5,577,262 A | * | 11/1996 | Pechanek et al. | 712/11 |
| 5,581,767 A | * | 12/1996 | Katsuki et al. | 712/11 |

* cited by examiner

Primary Examiner—Richard L. Ellis
Assistant Examiner—Gautam R. Patel
(74) Attorney, Agent, or Firm—Oblon, Spivak, McClelland, Maier & Neustadt, P.C.

(57) ABSTRACT

A parallel computer of this invention includes a plurality of memory elements and a plurality of processing elements and each of the processing elements is connected to logically adjacent memory elements. For example, the processing elements which corresponds to a logical position (i, j) is connected to the memory elements which correspond to a plurality of logical positions (i, j), (i, j+1), (i+1, j) and (i+1, j+1). It is preferable if each of the memory elements can be accessed from the exterior. According to this invention, efficient memory access can be made and the parallel processing can be performed at high speed without increasing the hardware amount and making the control operation complicated. Further, the operation speed of the image processing can be enhanced by constructing an image memory by use of a plurality of memory elements and causing the processing element to effect the image processing in a distributed and cooperative manner.

21 Claims, 8 Drawing Sheets

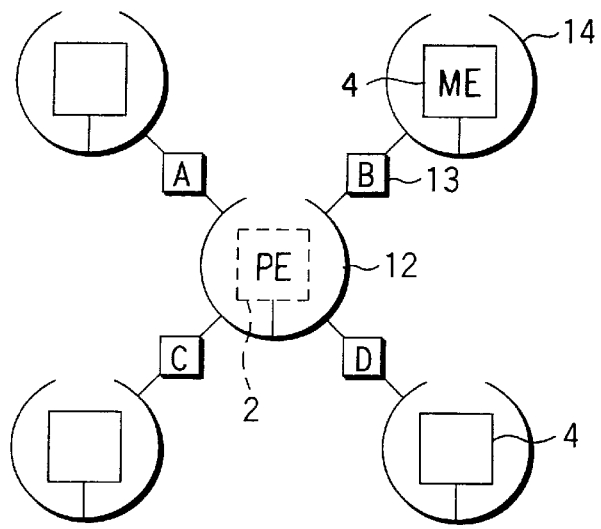
FIG. 6
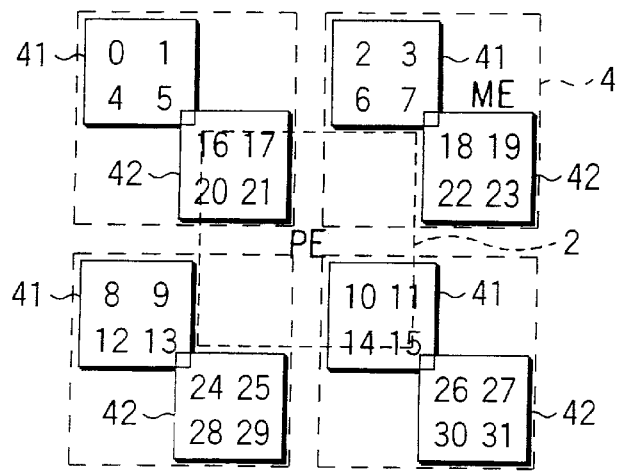
FIG. 7
FIG. 8

| ADDRESS a7a6a3a2 | TRI-STATE BUFFER | | | | | | | |
|---|---|---|---|---|---|---|---|---|
| | B1 | B2 | B3 | B4 | B5 | B6 | B15 | B16 |
| 0000 | ON | | | | | | | |
| 0001 | | ON | | | | | | |
| 0010 | | | ON | | | | | |
| 0011 | | | | ON | | | | |
| 0100 | | | | | ON | | | |
| 0101 | | | | | | ON | | |
| ⋮ | | | | | | | | |
| 1110 | | | | | | | ON | |
| 1111 | | | | | | | | ON |

| ADDRESS a6a5a2 | TRI-STATE BUFFER | | | | |
|---|---|---|---|---|---|
| | A | B | C | D | E |
| 000 | ON | OFF | OFF | OFF | OFF |
| 001 | OFF | ON | OFF | OFF | OFF |
| 010 | OFF | OFF | ON | OFF | OFF |
| 011 | OFF | OFF | OFF | ON | OFF |
| 1** | OFF | OFF | OFF | OFF | ON |

PARALLEL COMPUTER WITH IMPROVED ACCESS TO ADJACENT PROCESSOR AND MEMORY ELEMENTS

BACKGROUND OF THE INVENTION

This invention relates to a parallel computer having a plurality of processing elements and more particularly to a parallel computer suitable for performing the image processing operation.

Conventionally, as the construction of the parallel computer, a local memory type and shared memory type are known.

In the parallel computer of local memory type, a local memory is provided for each processing element. Therefore, each of the processing elements can make access to the local memory which belongs thereto independently from the other processing elements. However, the parallel computer has a disadvantage that each processing element cannot make direct access to the local memory which belongs to the other processing element.

In the parallel computer of shared memory type, all of the processing elements share a memory. Therefore, each of the processing elements can make direct access to the shared memory. However, the parallel computer has a disadvantage that memory access contention between a plurality of processing elements occurs and the parallel operation will be easily disturbed.

As another type of parallel computer for solving the above problems, there is provided a parallel computer having a local cache memory for each processing element and a main memory shared by all of the processing elements. Further, as s till another type of parallel computer, there is provided a parallel computer which shares information between processing elements by use of crossbar switches. However, the above types of parallel computers are complicated in construction, the hardware amount increases and the control operation becomes difficult.

As one of the application fields of the parallel computer, an image processing operation is provided.

For example, in a case where the image processing operation is effected by use of a parallel computer having processing elements connected in a matrix form, a method for assigning portions of an image to the respective processing elements and causing the processing elements to process the partial images assigned thereto in parallel, thereby enhancing the speed of the image processing operation is considered. In the case of application to the image processing operation, since most memory accesses are localized to relatively nearby memory areas, it is considered effective to utilize the parallel computation in order to attain th e high processing speed.

However, in order to enhance the image processing speed, the conventional parallel computer of local memory type is insufficient. The reason is that it is necessary for each processing element to use the partial image assigned to the adjacent processing element in the computation for the end portion (boundary) of the partial image assigned to itself when the image processing such as the filtering process is effected, for example. That is, since access from a processing element to a memory which belongs to the adjacent processing element is made by use of communication between the elements via the adjacent processing element, a problem that the access speed becomes low occurs.

Also, in the shared memory type parallel computer is insufficient. This is because memory accesses simultaneously occur to cause memory access contention, the parallel operation cannot be effectively performed, and the practically high operation speed cannot be attained.

Further, the parallel computer using the cache memory is not effective since the image data size is large and the hit ratio is low. In addition, the parallel computer using the crossbar switch is not effective since the hardware becomes excessively complicated.

As described above, in the conventional parallel computer, it takes a long time for memory access in the local memory type and memory access contention occurs and a satisfactory parallel operation cannot be effected in the shared memory type. Further, in the parallel computer using the cache memory or crossbar switch, a problem occurs in the hardware amount and control operation.

BRIEF SUMMARY OF THE INVENTION

This invention has been made in order to solve the above problems and an object of this invention is to provide a parallel computer capable of effecting the parallel processing operation at higher speed and making efficient memory access without increasing the hardware amount and making the control operation complicated.

That is, in order to attain the above object, a parallel computer according to a first aspect of this invention comprises a plurality of memory elements which are logically arranged in a first arrangement pattern and store data; a plurality of processing elements which are logically arranged in a second arrangement pattern corresponding to the first arrangement pattern and process the data of the memory elements; and a connecting system which logically connects each of the processing elements to associated memory elements included among the memory elements.

Preferably, the processing elements are logically arranged in a matrix as the first arrangement pattern and the memory elements are logically arranged in a matrix as the second arrangement pattern, and the connecting system includes a connection section which connects each of the processing elements to memory elements included in the memory elements and logically arranged around the each of the processing elements.

Preferably, the processing elements and the memory elements are equal in number to each other and are alternately arranged to form a logical matrix array pattern, and the connecting system includes a connection section which connects peripheral processing elements included among the processing elements and logically arranged in a periphery of the matrix array pattern to associated peripheral memory elements included in the memory elements to form a logical closed loop in an array of the processing elements and the memory elements.

Preferably, each of the processing elements has a function capable of performing a direct access only to the associated memory elements which are connected by the connecting system.

Preferably, each of the memory elements has a function capable of being directly accessed only by those of the processing elements that are connected thereto by the connecting system.

Preferably, the connecting system includes a plurality of processing element buses respectively and exclusively provided for the processing elements, a plurality of memory element buses respectively and exclusively provided for the processing elements, and a plurality of switching elements connected between each of the processing element buses and associated element buses included among the memory element buses.

Preferably, only one of the switching elements is selectively made conductive.

Preferably, the memory elements are connected in a matrix via the processing elements to construct an image frame buffer.

Preferably, the parallel computer further comprises an access system which accesses each of the memory elements from an exterior.

Preferably, the parallel computer further comprises local memories respectively and exclusively provided for the processing elements.

A parallel computer according to a second aspect of this invention comprises n×m (n and m are integral numbers) processing elements which process data; n×m processing element buses respectively provided for the processing elements; (n+1)×(m+1) memory element buses respectively provided for (n+1)×(m+1) memory elements to be accessed; and a plurality of switching elements which connect one of the processing element buses which is connected to one of the processing elements which corresponds to a logical position (i, j) (i is an integral number from 0 to (n−1) and j is an integral number from 0 to (m−1)) to the memory element buses connected to those of the memory elements which correspond to a plurality of logical positions (i, j), (i, j+1), (i+1, j and (i+1, j+1).

Preferably, in the parallel computer the processing elements are equal to (n+1)×(m+1) in number, and the parallel computer further comprises other switching elements for connecting predetermined processing elements included in the processing element buses and associated memory buses included in the memory element buses to form a logical closed loop of the processing element buses and the memory element buses.

Preferably, each of the processing elements has a section which directly accesses only to the memory elements which are connected thereto by the switching elements.

Preferably, only one of the switching elements is selectively made conductive.

Preferably, an image memory is constructed by the (n+1)×(m+1) memory elements.

Preferably, the parallel computer further comprises other switching elements for connecting the memory elements to an exterior.

Preferably, the parallel computer further comprises inherent local memories respectively provided for the processing elements and other switching elements which connect the processing element buses and the inherent local memories.

A parallel computer for image processing according to a third aspect of this invention comprises n×m (n and m are integral numbers) processing elements which perform an image processing in a distributed and cooperative manner; an image memory having (n+1)×(m+1) memory elements which store partial image data, respectively, to store image data; a plurality of processing element buses respectively and independently provided for the processing elements; a plurality of memory element buses respectively and independently provided for the memory elements; a plurality of internal switching elements which selectively connect one of the processing element buses which is connected to that of the processing elements which corresponds to a logical position (i, j) (i is an integral number from 0 to (n−1) and j is an integral number from 0 to (m−1)) to the memory element buses connected to those of the memory elements which correspond to a plurality of logical positions (i, j), (i, j+1), (i+1, j) and (i+1, j+1); and a plurality of external switching elements respectively connected to the memory element buses, for inputting/outputting partial image data between an external device and the memory elements.

Preferably, in the parallel computer the processing elements is equal to (n+1)×(m+1) in number, and the parallel computer further comprises other internal switching elements for connecting predetermined processing elements included in the processing element buses and associated memory buses included in the memory element buses to form a logical closed loop of the processing element buses and the memory element buses.

Preferably, each of the processing elements has a function for effecting the image processing in the distributed and cooperative manner based on partial images stored only in associated ones of the memory elements which are directly accessed by the each of the processing elements via corresponding ones of the internal switching elements.

Preferably, the parallel computer further comprises a global processor which accesses the image data stored in the image memory via the external switching elements and calculating the global feature based on the image data.

According to this invention, a plurality of processing elements locally share a plurality of memory elements so that efficient memory access can be made and the parallel processing operation can be effected at higher speed without increasing the hardware amount and making the control operation complicated.

Further, according to this invention, when it is considered to apply this invention to image processing, each of the processing elements can make access to an area which is close to the processing element and is half the storage area of partial image data managed by the adjacent processing element.

In addition, according to this invention, it is possible to realize a parallel computer in a relatively simple hardware construction suitable for the characteristic of image processing or the like.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6 is a diagram for illustrating an example of a tri-state buffer control system;

FIG. 7 is a diagram for illustrating an example of the tri-state buffer control system;

FIG. 8 is a diagram showing an example of memory address assignment in a case wherein a plurality of frame buffers are used;

DETAILED DESCRIPTION OF THE INVENTION

There will now be described embodiments of this invention with reference to the accompanying drawings.

Figure 1:
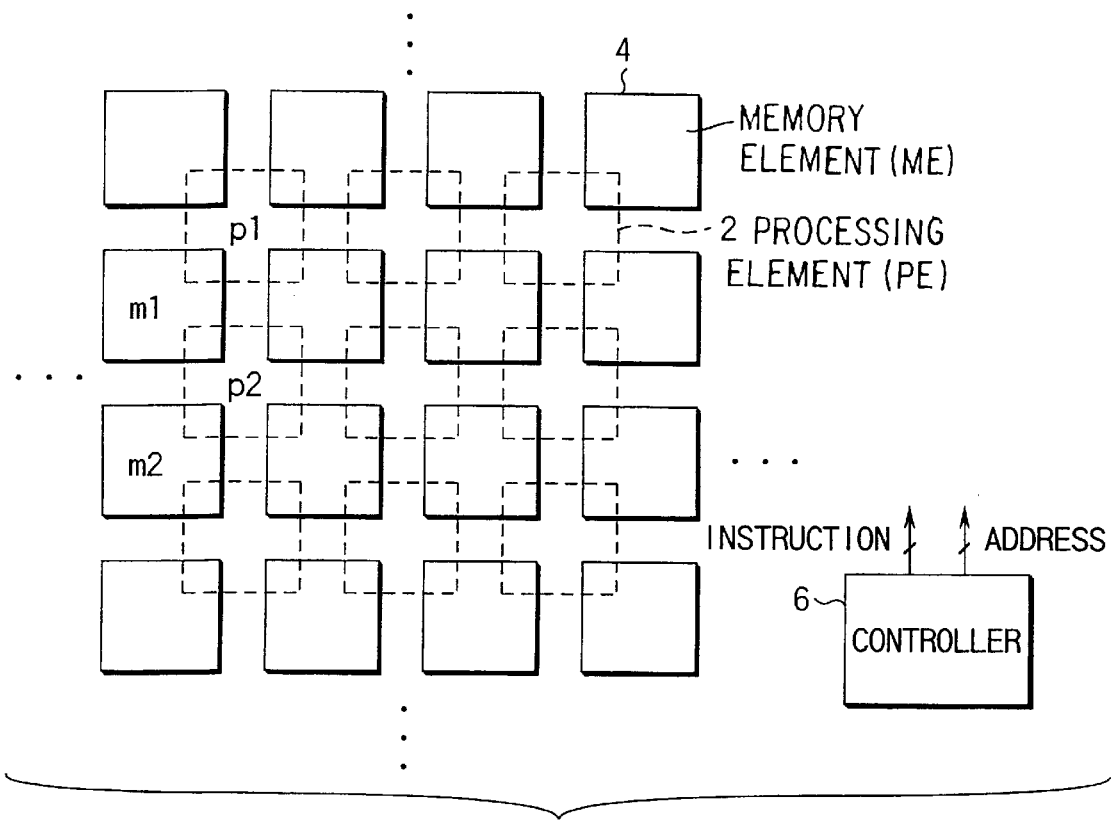
FIG. 1 is a diagram schematically showing an example of the construction of a parallel computer according to a first embodiment of this invention.
Figure 2:
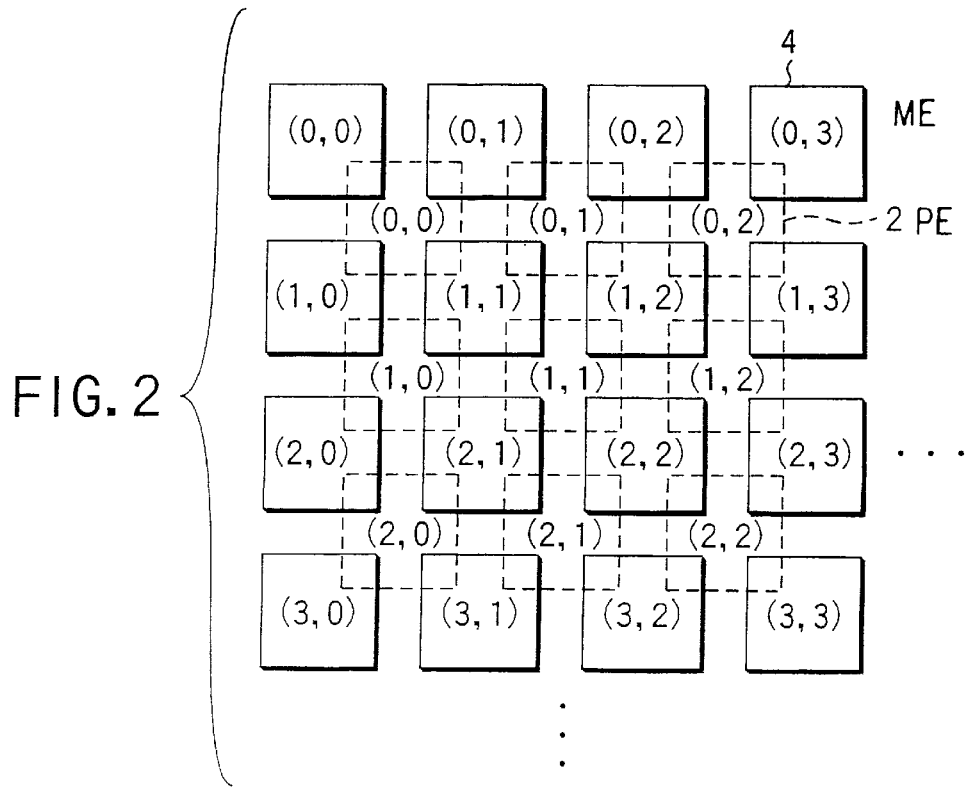
FIG. 2 is a diagram for illustrating the connection relation between processing elements and memory elements.

FIG. 1 is a diagram schematically showing an example of the construction of a parallel computer according to a first embodiment of this invention. The parallel computer includes a plurality of processing elements 2 and a plurality of memory elements 4. In FIG. 1, rectangles of solid lines indicate memory elements and rectangles of broken lines indicate processing elements. An instruction for each processing element and an address for memory access are issued from a controller 6.

Further, FIG. 1 is a diagram for illustrating the logical connection relation between the processing elements and the memory elements (that is, the physical sizes and the arrangements of the processing elements and memory elements are not necessarily limited to those shown in FIG. 1). In FIG. 1, if the broken-line rectangle and the solid-line rectangle overlap each other, it indicates that the processing element expressed by the broken-line rectangle and the memory element expressed by the solid-line rectangle are connected to each other. Each processing element can make direct access to the memory elements which are connected thereto.

That is, in this embodiment, as schematically shown in FIG. 1, if a plurality of processing elements 2 are arranged in a matrix form, a plurality of memory elements 4 are arranged in a matrix form, and the matrix of the memory elements is disposed with a deviation of half pitch with respect to the matrix of the processing elements, then each processing element is designed so as to make direct access to memory elements adjacent to the processing element (the memory elements overlapping the processing element in FIG. 1). In other words, each memory element can be locally shared only by the processing elements adjacent to the memory element.

The number and arrangement of the processing elements, the number and arrangement of the memory elements and the connecting configuration between the processing elements and the memory elements can be variously set. Preferably, as shown in FIG. 1, if the processing elements 2 are arranged in an n×m (n and m are integral numbers and a case wherein n=m is included) array, the memory elements 4 may be arranged in an (n+1)×(m+1) array so that each processing element can access the four memory elements.

In this case, the logical connection relation between the processing elements 2 and the memory elements 4 is explained by taking a case wherein the processing elements 2 are arranged in an n×m array and the memory elements 4 are arranged in an (n+1)×(m+1) array as an example.

Assume now that 2-dimensional logical numbers (0,0) to (n−1, m−1) are attached to the respective processing elements 2 and 2-dimensional logical numbers (0,0) to (n, m) are attached to the respective memory elements 4. At this time, in this embodiment, the processing element corresponding to a number (i, j) (I is an integral number from 0 to (n−1) and j is an integral number from 0 to (m−1)) is connected to the memory elements corresponding to numbers (i, j), (i, j+1), (i+1, j) and (i+1, j+1).

For example, the processing element corresponding to the number (1, 2) is connected to the memory elements corresponding to the numbers (1, 2), (1, 3), (2, 2) and (2, 3).

At this time, the memory element corresponding to the number (i, j) is connected to the processing elements corresponding to the numbers (i−1, j−1), (I−1, j), (i, j−1) and (i, j).

However, the processing element or memory element corresponding to the above number may not exist depending on the numbers and arrangements of the processing elements and memory elements in some cases. In such a case, the number may be treated as an invalid number.

Further, an image frame buffer can be constructed by a group of memory elements 4, that is, by connecting each of the memory elements 4 to (two, three or four) other memory elements 4 logically adjacent to the each of the memory elements 4 via one or more associated processing elements 2.

Each processing element can make direct access to the memory elements which are locally shared by the processing element by utilizing the logical connection configuration between the processing elements and the memory elements as shown in FIG. 1.

For example, if an image frame buffer is constructed by the memory element group arranged in a matrix form as shown in FIG. 1 and the processing element group is caused to perform the image processing, each processing element can make direct access to a half portion of a memory managed by the processing element apparently adjacent to the former processing element which is close to the former processing element and obtain partial image data stored therein. Particularly, the above construction can most effectively function in a case wherein a process such as the image processing having a characteristic that most accesses are localized to a relatively nearby memory area is effected.

If it is necessary to access the memory element to which the processing element cannot make direct access, another processing element may be used to effect data transfer. For example, a case wherein the processing element indicated by p1 in FIG. 1 reads out data in the memory element indicated by m2 is explained. In this case, the processing element indicated by p2 first reads out data in the memory element indicated by m2 and then the readout data is written into the memory element indicated by m1. After this, the processing element indicated by p1 reads out data which has been written into the memory element indicated by m1.

Further, in the case of write access, the above procedure may be effected in the reverse order.

If a plurality of processing elements are required to be used for memory access, the above procedure may be adequately and repeatedly effected.

Figure 3:
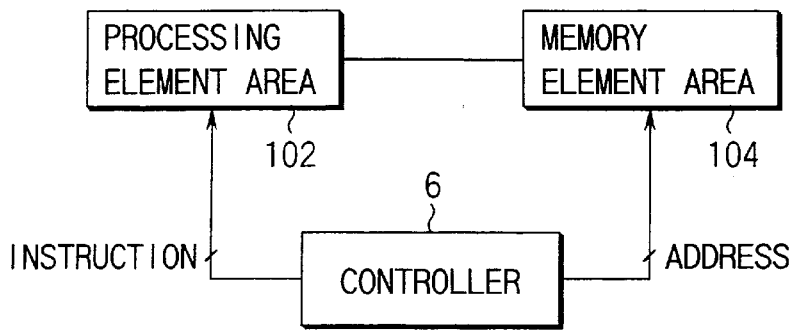
FIG. 3 is a diagram for illustrating the connection relation between the processing elements and memory elements.

As described before, this embodiment is explained with emphasis put on the logical connecting relation between the processing elements and the memory elements. Therefore, the physical sizes and the arrangements of the processing elements and memory elements are not necessarily limited to those shown in the drawing. Further, the terms "adjacent", "arranged in a matrix form", "connected in a loop form" and the like indicate the logical relation. As the physical arrangement, the processing elements and the memory elements may be arranged in a mixed configuration or the processing elements and the memory elements may be arranged in totally different areas as shown in FIG. 3. An example of the more detailed construction of the parallel computer according to this embodiment will be explained below.

Hereinafter, the controller 6 is omitted in the following drawings showing examples of the construction.

Figure 4:
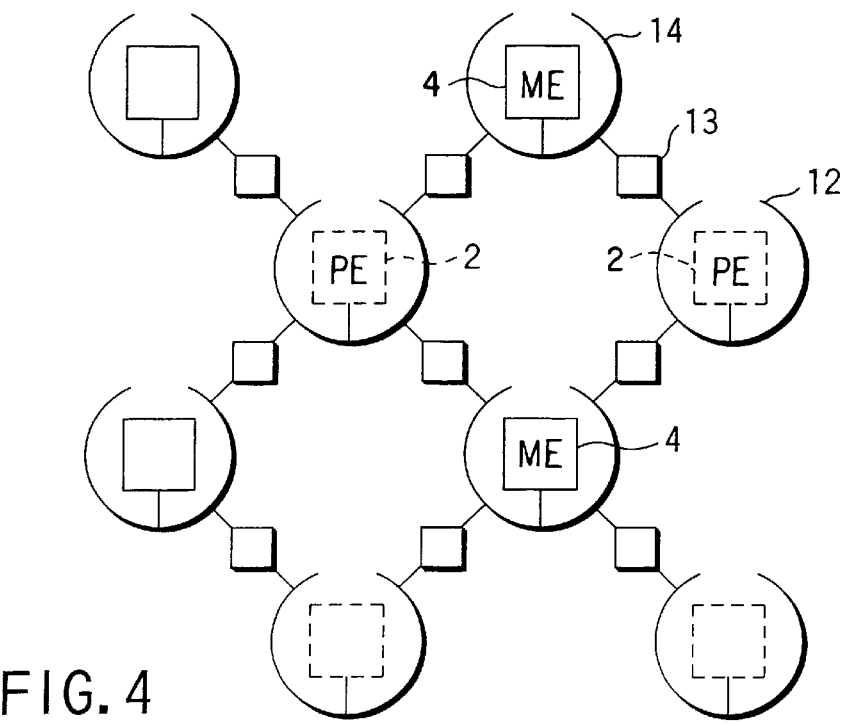
FIG. 4 is a diagram showing an example of the construction of a parallel computer according to the above embodiment.

FIG. 4 shows an example of the construction of the parallel computer constructed by connecting the processing elements and the memory elements by use of buses and tri-state buffers. In FIG. 4, part of the construction extracted from the whole construction is shown.

As shown in FIG. 4, in this embodiment, buses are used in order to connect the processing element 2 and the memory element 4 which are adjacent to each other in FIG. 1. The bus for the processing element and the bus for the memory element are independently provided. A processing element bus 12 of the processing element 2 is connected to a memory element bus 14 of the memory element 4 which is adjacent to the processing element via a tri-state buffer 13.

In a case wherein a group of memory elements arranged in a matrix form is used as the frame buffer and the processing elements arranged in a matrix form are controlled by SIMD type for image processing, for example, two or more tri-state buffers connected to the same bus cannot be turned ON at the same time.

Figure 5:
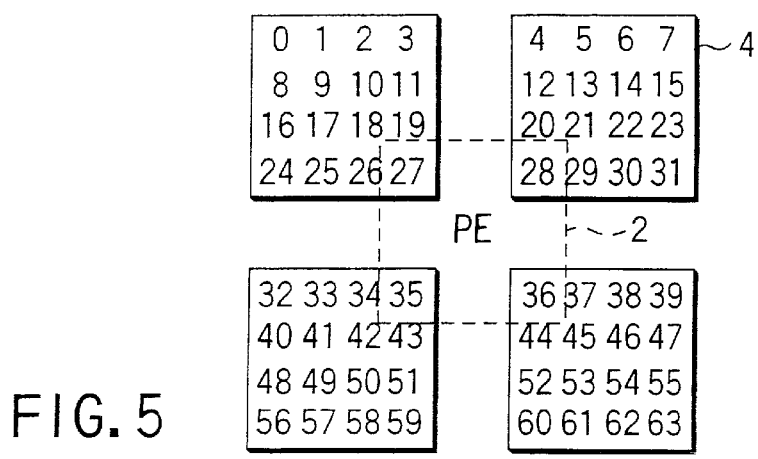
FIG. 5 is a diagram showing an example of memory address assignment.

One example of memory address assignment in this case is shown in FIG. 5 and one example of the tri-state buffer control system is shown in FIGS. 6 and 7. In this example, for making the explanation short and clear, the number of memories in each memory element is set to 16.

The address lines of the memories are indicated by a5, a4, a3, a2, a1, a0 from the highest order.

Addresses (0 to 63) as shown in FIG. 5 are assigned to memories in the four memory elements adjacent to one processing element. In this case, for example, a4, a3, a1, a0 are used to distinguish the memories in each memory element and a5 and a2 are used to control the ON/OFF states of the tri-state buffers as shown in FIGS. 6 and 7. Thus, this invention can be realized in a preferable form.

In the above example, when the address is "000011", for example, the tri-state buffer A is turned ON and a memory indicated by the address "3" in FIG. 5 is treated as a memory to be accessed. Further, for example, when the address is "000111", the tri-state buffer B is turned ON and a memory indicated by the address "7" in FIG. 5 is treated as a memory to be accessed.

In practice, the number of memories in the memory element is preferably larger than that in the case of FIG. 5 and may be preferably set to 256 (256 words).

Next, a case wherein a plurality of frame buffers are used in the construction shown in FIG. 4 is explained.

Figures 9, 10:
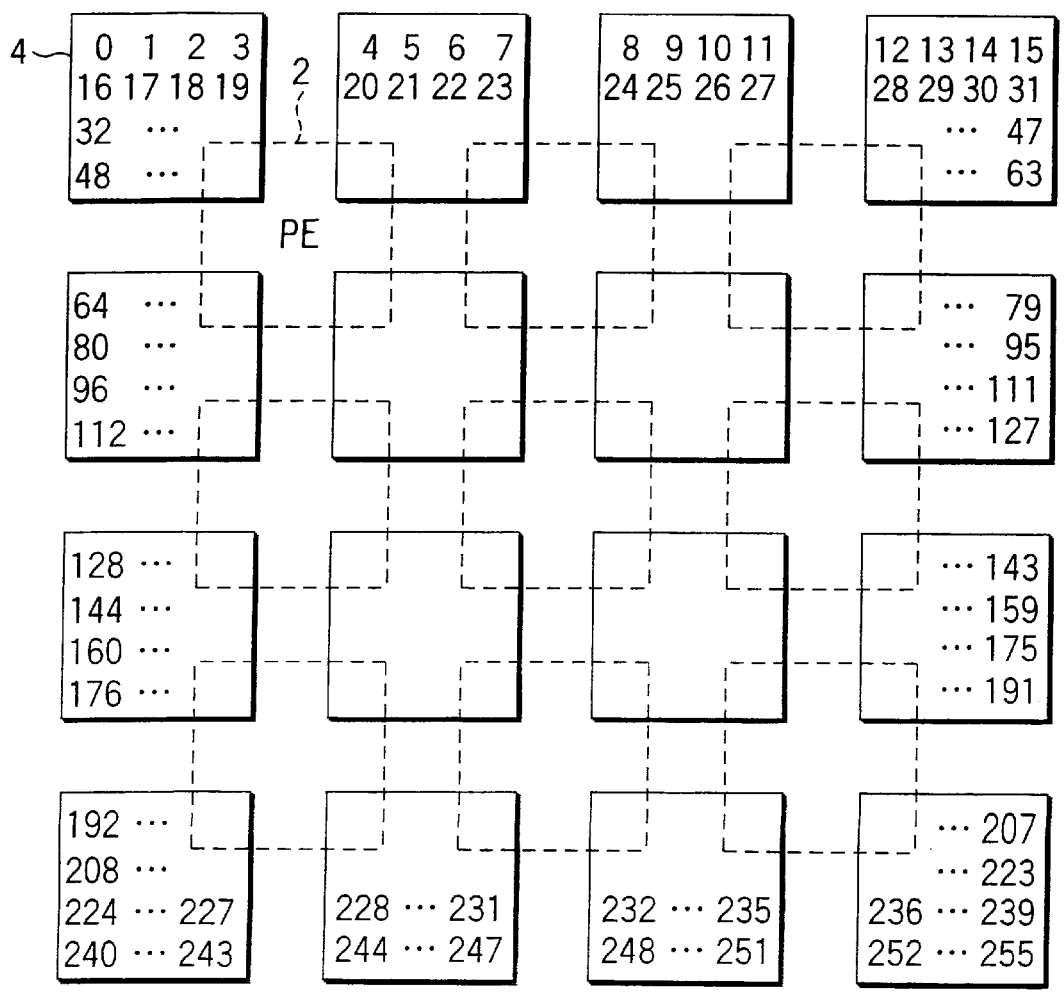
FIG. 9 is a diagram for illustrating an example of a tri-state buffer control system in a case wherein a plurality of frame buffers are used.
FIG. 10 is a diagram showing an example of memory address assignment when viewed from the exterior.

One example of memory address assignment in this case is shown in FIG. 8 and one example of the tri-state buffer control system is shown in FIGS. 6 and 9. For making the explanation short and clear, the number of memories in the memory element shown in FIG. 8 is set to 8 and four of the eight memories make one set to constitute two sets of frame buffers. In FIG. 8, a reference numeral 41 denotes a first frame buffer and a reference numeral 42 denotes a second frame buffer.

The address lines of the memories are indicated by a4, a3, a2, a1, a0 from the highest order. Addresses (0 to 31) as shown in FIG. 8 are assigned to memories in the four memory elements adjacent to one processing element. In this case, for example, a4, a2, a0 may be used to distinguish the memories in each memory element and a3 and a1 may be used to control the ON/OFF states of the tri-state buffers as shown in FIGS. 6 and 9.

In the above example, when the address is "10000", for example, the tri-state buffer A is turned ON and a memory indicated by the address "16" of the second frame buffer shown in FIG. 8 is treated as a memory to be accessed. Further, for example, when the address is "00011", the tri-state buffer B is turned ON and a memory indicated by the address "3" of the first frame buffer shown in FIG. 8 is treated as a memory to be accessed.

Next, a case wherein the memory element is accessed (data write and data readout) from the exterior of the parallel computer in each construction explained so far is explained.

FIG. 10 shows one example of desirable address assignment in this case. For making the explanation short and clear, one memory element is constructed by 16 memories (in practice, 256, for example) and the number of memory elements is set to 16 (in practice, 384, for example).

The address lines of the memories are indicated by a7, a6, a5, a4, a3, a2, a1, a0 from the highest order. As shown in FIG. 10, addresses (0 to 255) are assigned. In this case, for example, a5, a4, a1, a0 may be used to distinguish the memories in each memory element and a7, a6, a3 and a2 may be used to control the ON/OFF states of the tri-state buffers.

Figure 11:
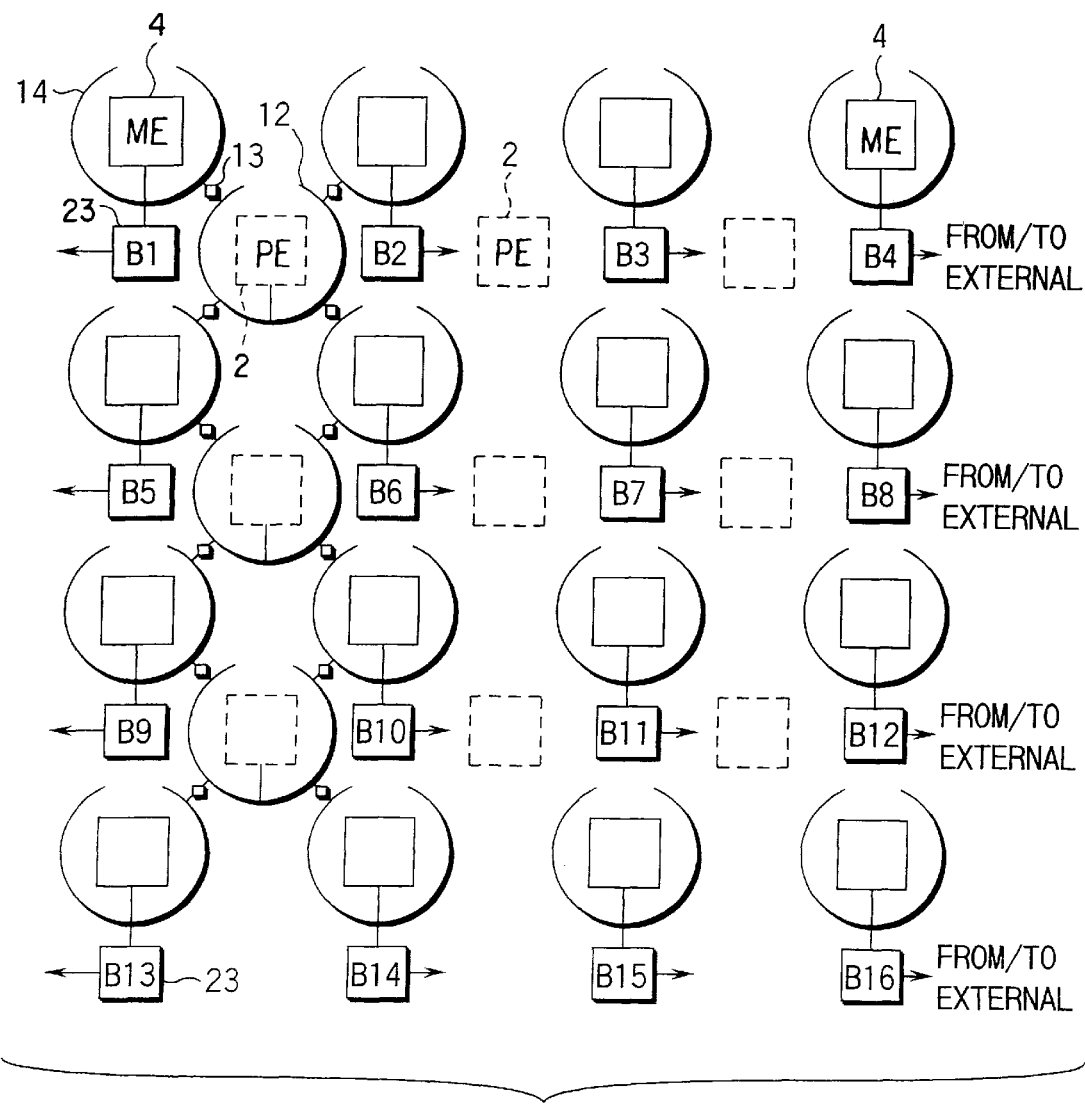
FIG. 11 is a diagram for illustrating an example of a tri-state buffer control system in a case wherein access is made from the exterior.

FIG. 11 shows an example of the construction of an external tri-state buffer 23 connected to the memory element bus 14 for access from the exterior. In FIG. 11, the processing element buses 12 and the internal tri-state buffers 13 for connection between the processing elements 12 and the memory elements 14 are partly omitted.

Figures 12, 13, 14:
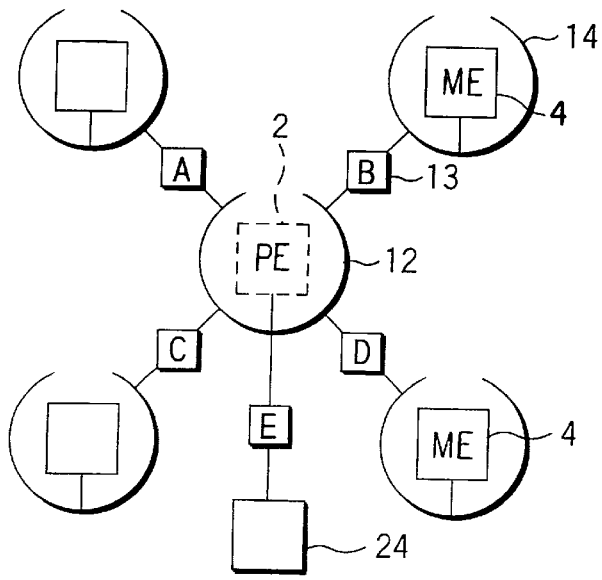
FIG. 12 is a diagram for illustrating an example of a tri-state buffer control system in a case wherein access is made from the exterior.
FIG. 13 is a diagram for illustrating an example of a tri-state buffer control system in a case wherein a local memory is additionally provided.
FIG. 14 is a diagram for illustrating an example of the tri-state buffer control system in a case wherein a local memory is additionally provided.

FIG. 12 shows an example of the control system for the tri-state buffers 23. In FIG. 12, only the ON states are shown and description of the OFF states is omitted (space portions in FIG. 12 correspond to the OFF states).

With the above construction, memory access from the exterior, that is, data writing into the memory element from the exterior or data readout from the memory element to the exterior can be effected.

Next, a case wherein an inherent local memory is added to each processing element in each construction explained so far is explained.

In a case where each processing element accesses different addresses as in a case wherein access is made to a lookup table, a problem may occur in some cases if all of the memories in the memory element are shared by the adjacent processing elements. Therefore, in order to solve the above problem, it is preferable to add an inherent local memory to each processing element in addition to the construction explained so far.

In this example, a case wherein the local memories are further added to the construction shown in FIGS. 6 and 7 is explained.

FIG. 13 shows an example in which a local memory 24 is added to each processing element in the construction of FIG. 6. FIG. 14 shows one example of the control system for the tri-state buffer 13. In this case, a6 is additionally provided on the higher order of the address line of the memory shown in FIG. 7. That is, the tri-state buffers A to D for connecting the processing element buses to the memory element buses are ON/OFF controlled like the case of FIG. 7 in the case of a6=0 and the tri-state buffer E for connecting the processing element bus to the local memory is controlled to be turned ON in the case of a6=1 (a5, a2 are "don't care").

In the above case, a case wherein the end portion exists in the logical connecting construction between the processing elements and the memory elements is explained. It is possible to connect the processing elements and the memory elements in a loop form in each construction explained so far. A case wherein the logical connecting construction has a periodic boundary is explained below with emphasis put on the difference from the construction explained so far.

Figure 15:
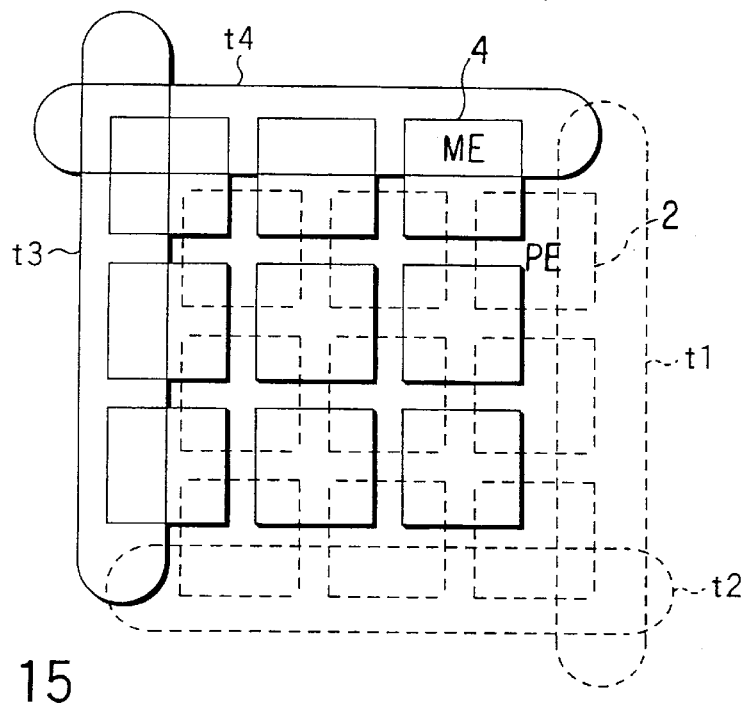
FIG. 15 is a diagram for illustrating a case wherein the parallel computer according to the above embodiment has a periodic boundary.

FIG. 15 is a diagram schematically showing the parallel computer used for the above purpose. In FIG. 15, for making the explanation short and clear, a case wherein the numbers of the processing elements and memory elements are set to 3×3, for example, is shown. FIG. 15 is a diagram for illustrating the logical connecting relation between the processing elements and the memory elements. In FIG. 15, the controller for issuing an instruction for each processing element and an address for memory access is omitted.

Figure 16:
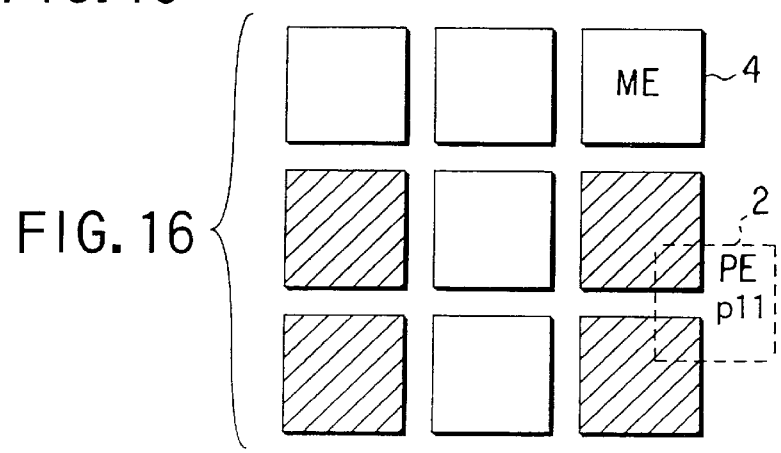
FIG. 16 is a diagram for illustrating a case wherein the parallel computer according to the above embodiment has a periodic boundary.
Figure 17:
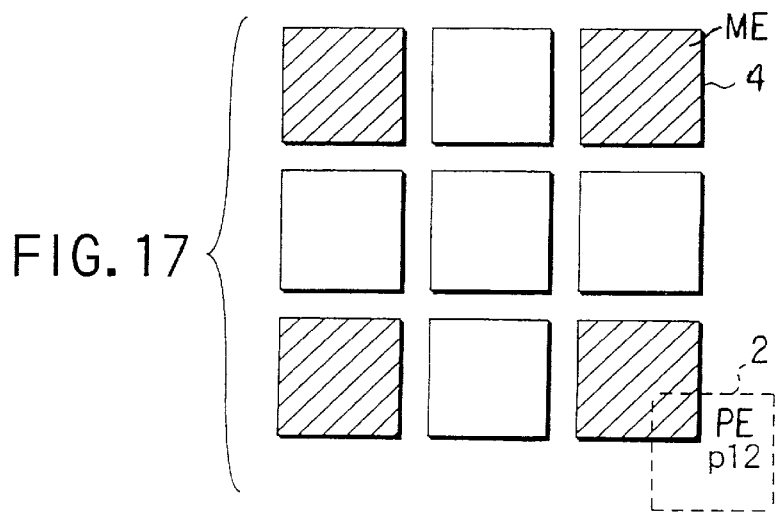
FIG. 17 is a diagram for illustrating a case wherein the parallel computer according to the above embodiment has a periodic boundary.

The construction obtained by selecting all of the memory elements and one processing element from the construction of FIG. 15 is shown in FIGS. 16 and 17.

In FIG. 1 or the like, the element (processing element or memory element) lying in the end portion of the logical connecting construction has no logical connecting relation with the element lying in the end portion on the opposite side, but in the case of FIG. 15, the element lying in the end portion of the logical connecting construction and the element lying in the end portion on the opposite side of the same row or same column are connected to each other (t1 to t4 in FIG. 15 indicate that the elements are connected in the row and column directions in a loop form and the leftmost and rightmost portions and the uppermost and lowermost portions are observed as if they are arranged adjacent to each other).

That is, in the construction of this example, the numbers and logical arrangements of processing elements and memory elements are set equal to each other. In the case of FIG. 15, each processing element can access the four memory elements and each memory element can be shared by the four processing elements.

For example, the processing element indicated by p11 has a connecting relation with respect to the four memory elements indicated by oblique lines as shown in FIG. 16 (the processing element can access the four memory elements) and the processing element indicated by p12 has a connecting relation with respect to the four memory elements indicated by oblique lines as shown in FIG. 17 (the processing element can access the four memory elements).

For example, if an image frame buffer is constructed by the memory element group and the processing elements are caused to perform the image processing, the leftmost and rightmost portions and the uppermost and lowermost portions of an image are observed as if they are arranged adjacent to each other. This is particularly effective to process the periodic image.

Figure 18:
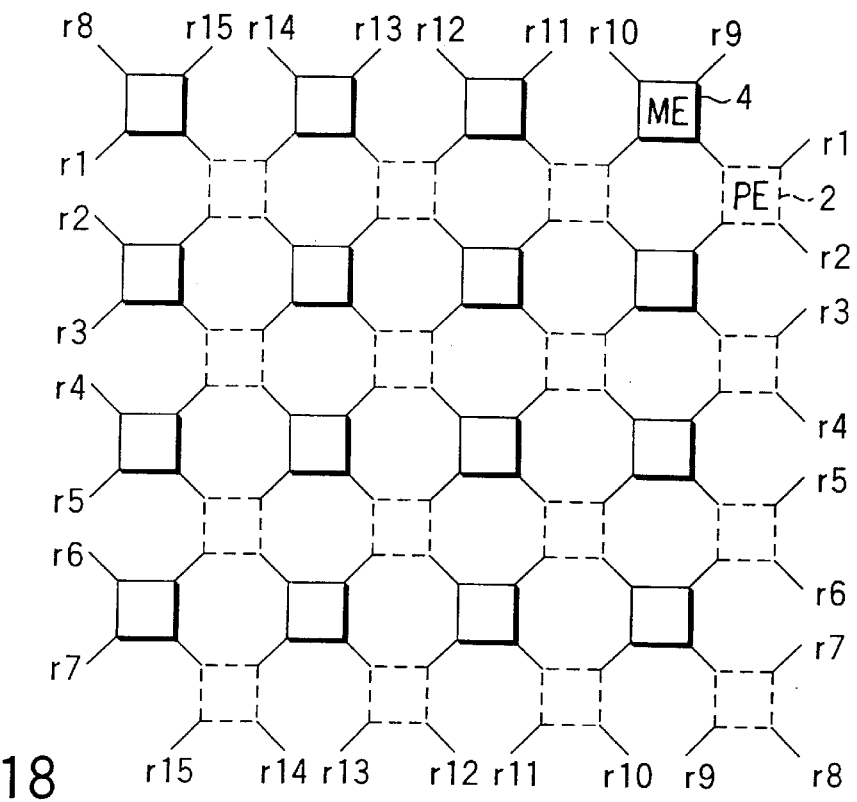
FIG. 18 is a diagram for illustrating a case wherein the parallel computer according to the above embodiment has a periodic boundary.

FIG. 18 shows an example of the parallel computer constructed by connecting the processing elements with the 4×4 logical arrangement to the memory elements with the 4×4 logical arrangement by use of buses and tri-state buffers. In FIG. 18, the buses and tri-state buffers shown in FIG. 4 are omitted and only the connection relation therebetween is shown.

In FIG. 18, symbols r1 to r15 are described and the symbols indicate that portions to which the same symbol is attached are connected to each other. That is, the processing element and the memory element to which the same symbol is attached are connected to each other via the buses and tri-state buffer in such a form as shown in FIG. 4. For example, the processing element of r8 in the bottom rightmost portion is connected to the memory element of r8 in the top leftmost portion and the processing element can access the memory element.

In this case, the assignment of memory addresses and the control system of the tri-state buffers are the same as those in the construction of the example explained with reference to FIGS. 5, 6 and 7.

Further, the construction in which a plurality of frame buffers are used, the construction in which the memory element is accessed from the exterior of the parallel computer and the construction in which inherent local memories are respectively added to the processing elements are the same as those described before.

In the following description, a case wherein the parallel computer is applied to the image processing is explained in more detail.

Figure 19:
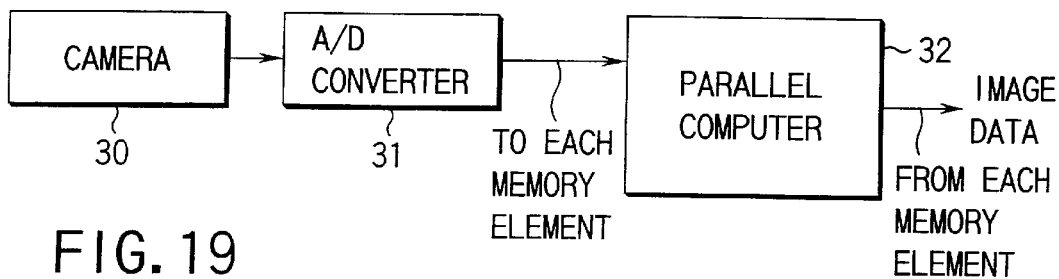
FIG. 19 is a diagram for illustrating an example in which the parallel computer according to the above embodiment is applied to image processing.

FIG. 19 shows an example of the construction of an image processing device constructed by use of the parallel computer.

The image processing device is constructed by connecting a camera 30 for effecting photoelectric conversion, an A/D converter 31 for A/D converting an electrical signal output from the camera 30 and a parallel computer 32.

The parallel computer 32 may be of any type explained so far. Further, external tri-state buffers for connection with the exterior as shown in FIG. 11 are provided. In this case, memory elements connected in a matrix form in the parallel computer 32 are used as an image memory (for example, a frame buffer).

First, an image signal photographed by the camera 30 is converted into digital image data by the A/D converter 31.

Next, the image data is stored into a corresponding memory element via the external tri-state buffer shown in FIG. 11.

Then, the processing elements connected in a matrix form in the parallel computer 32 are caused to perform the image processing in a distributed and cooperative manner. That is, each of the processing elements performs the image processing in a distributed and cooperative manner based on an partial image stored in the memory element which can be directly accessed by the processing element via the internal tri-state buffer.

Processed image data obtained as the result of the image processing is stored into the corresponding memory element via the internal tri-state buffer by each of the processing elements.

Then, the processed image data stored in each of the memory elements is output to the exterior via the external tri-state buffer.

The image output to the exterior of the parallel computer 32 is displayed on a display, printed by a printer, stored into an external storage device or transferred via a network, for example.

As the camera and A/D converter, only one camera and one A/D converter can be used, but the following construction can be used to enhance the processing speed, for example.

The construction in which only one camera is used and a plurality of A/D converters are used.

The construction in which a plurality of cameras are used and a plurality of A/D converters are used.

The construction in which a set of the camera and A/D converter is provided for each memory (for each pixel).

In the above example, processed image data is output as the result of the image processing, but it is possible to output the global feature derived based on the image data as the processing result. As the global feature, for example, the leftmost position of moving objects, the position of the most significant optical flow and the like can be considered.

Figure 20:
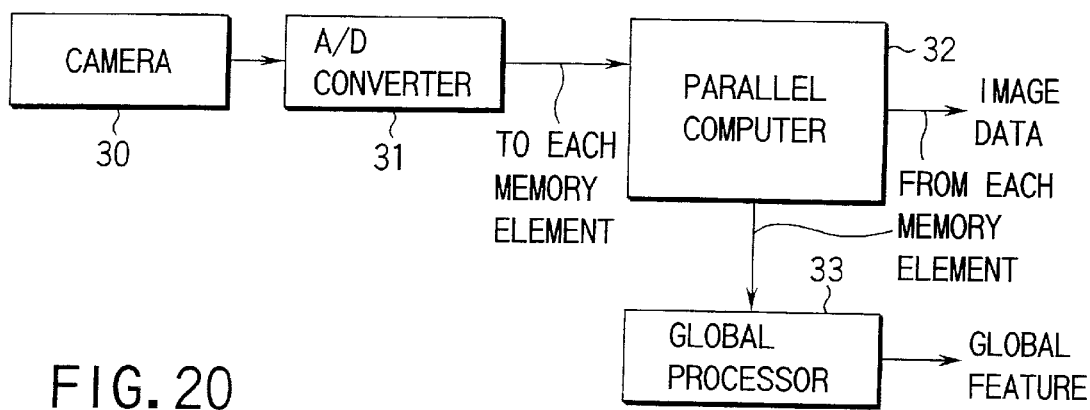
FIG. 20 is a diagram for illustrating an example in which the parallel computer according to the above embodiment is applied to image processing.

In this case, for example, as shown in FIG. 20, a global processor 33 for calculating the global feature is provided. The global processor 33 reads out image data stored in each of the memory elements via the external tri-state buffer shown in FIG. 11 as described before. Then, it calculates the global feature based on the readout image data and outputs the result of calculation.

A case wherein the arrangement pattern of the elements is a square or rectangle has been explained, but this invention can be applied to a case wherein the arrangement pattern of the elements is another shape such as a hexagon or triangle.

For example, in a case where two or three processing elements and memory elements are provided as one unit, it is impossible to 2-dimenisionally arrange the elements, but in this case, the processing elements and the memory elements may be linearly arranged and the array of the processing elements and the array of the memory elements may be shifted by a half pitch in the linearly arranged direction (the processing elements and the memory elements will be alternately connected). This construction is also included in this invention.

Even in a case where the numbers of processing elements and memory elements are set to such values as to 2-dimensionally arrange the processing elements and memory elements, the processing elements and the memory elements may be arranged such that the array of the processing elements and the array of the memory elements will be shifted by a half pitch only in the linearly arranged direction (first direction). In the second direction which is perpendicular to the first direction, data transfer or data access may be effected by use of the prior art such as communication with the processing element. In a case where most accesses are localized to relatively nearby areas as in the image processing, the parallel processing can be effected at higher speed in comparison with the conventional case. Particularly, it is effective when a narrow and long image is processed.

The construction in which the processing elements and the memory elements are connected via the buses and tri-state buffers is explained in the above example, but it is preferable to use a tri-state buffer which can transmit a signal in both directions as the tri-state buffer. Further, it is possible to use another switching element instead of the tri-state buffer.

This invention is not limited to the above embodiment and can be variously modified without departing from the technical scope thereof.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A parallel computer comprising:

a plurality of memory elements which store data;

a plurality of processing elements which process the data of the memory elements; and a connecting system which connects each of said processing elements to a group of said memory elements that are adjacent to each other, wherein, in a case where said processing elements are arranged in a two-dimensional matrix form, said memory elements are arranged in a two-dimensional matrix form, a matrix of said memory elements is offset with a deviation of half a pitch with respect to a matrix of said processing elements, and said connecting system connects each of said processing elements to said group of memory elements that are adjacent to each of said processing elements, wherein an image frame buffer is constructed by said memory elements which are adjacent and continuous to one another in said two-dimensional matrix, and wherein image data obtained by an image pickup device are input into said parallel computer and stored in said image frame buffer.

2. The parallel computer according to claim 1, wherein said processing elements of the matrix of said processing elements in a row direction are equal in number to processing elements of the matrix of said memory elements in a row direction, processing elements of the matrix of said processing elements in a column direction are equal in number to processing elements of the matrix of said memory elements in a column direction, said connecting system includes a connection section that connects each of said processing elements of the matrix of said processing elements lying in an end position to memory elements of the matrix of said memory elements lying in an end position on an opposite side and associated with each of said processing elements, and said connecting system connects each of said processing elements to four associated memory elements included in said memory elements.

3. The parallel computer according to claim 1, wherein each of said processing elements has a function capable of performing a direct access only to the associated memory elements which are connected by said connecting system.

4. The parallel computer according to claim 1, wherein each of said memory elements has a function capable of being directly accessed only by those of said processing elements that are connected thereto by said connecting system.

5. The parallel computer according to claim 1, wherein said connecting system includes a plurality of processing element buses respectively and exclusively provided for said processing elements, a plurality of memory element buses respectively and exclusively provided for said processing elements, and a plurality of switching elements connected between each of said processing element buses and associated element buses included among said memory element buses.

6. The parallel computer according to claim 5, wherein only one of the switching elements connected to a same processing element bus is selectively made conductive, and only one of the switching elements connected to a same memory element bus is selectively made conductive.

7. The parallel computer according to claim 1, further comprising an access system which accesses each of said memory elements from an exterior.

8. The parallel computer according to claim 1, further comprising local memories respectively and exclusively provided for said processing elements.

9. The parallel computer according to claim 1,
   wherein said processing elements of the matrix of said processing elements in a row direction are one less in number than processing elements of the matrix of said memory elements in a row direction, and
   processing elements of the matrix of said processing elements in a column direction are one less in number than processing elements of the matrix of said memory elements in a column direction, and said connecting system connects each of said processing elements to four associated memory elements included in said memory elements.

10. The parallel computer according to clam 1, wherein said processing elements are logically arranged in the matrix form, and said memory elements are logically arranged in the matrix form.

11. The parallel computer according to claim 1, wherein said processing elements are physically arranged in the matrix form, and said memory elements are physically arranged in the matrix form.

12. A parallel computer comprising:
   n×m (n and m are integral numbers) processing elements which process data;
   a plurality of processing element buses respectively provided for said processing elements;
   (n+1)×(m+1) memory element buses respectively provided for (n+1)×(m+1) memory elements to be accessed; and
   a plurality of switching elements which connect one of said processing element buses which is connected to one of said processing elements which corresponds to a logical position (i, j) (i is an integral number from 0 to (n−1) and j is an integral number from 0 to (m−1)) to the memory element buses connected to those of the memory elements which correspond to a plurality of logical positions (i, j), (i, j+1), (i+1, J) and (i+1, J+1),
   wherein an image frame buffer is constructed by said (n+1)×(m+1) memory elements which are adjacent and continuous to one another, and
   wherein image data obtained by an image pickup device are input to said parallel computer and stored in said image frame buffer.

13. The parallel computer according to claim 12, in which said processing elements are equal to (n+1)×(m+1) in number, and which further comprises other switching elements for connecting predetermined processing elements included in said processing element buses and associated memory buses included in said memory element buses to form a logical closed loop of said processing element buses and said memory element buses.

14. The parallel computer according to claim 12, wherein each of said processing elements has a section which directly accesses only to the memory elements which are connected thereto by said switching elements.

15. The parallel computer according to claim 12, wherein only one of the switching elements connected to a same processing element bus is selectively made conductive, and only one of the switching elements connected to a same memory element bus is selectively made conductive.

16. The parallel computer according to claim 12, further comprising other switching elements for connecting said memory elements to an exterior.

17. The parallel computer according to claim 12, further comprising inherent local memories respectively provided for said processing elements and other switching elements which connect said processing element buses and said inherent local memories.

18. A parallel computer for image processing comprising:
   n×m (n and m are integral numbers) processing elements which perform an image processing in a distributed and cooperative manner;
   an image memory having (n+1)×(m+1) memory elements which store partial image data, respectively, to store image data;
   a plurality of processing element buses respectively and independently provided for said processing elements;
   a plurality of memory element buses respectively and independently provided for said memory elements;
   a plurality of internal switching elements which selectively connect one of the processing element buses which is connected to that of the processing elements which corresponds to a logical position (i, 1) (i is an integral number from 0 to (n−1) and j is an integral number from 0 to (m−1)) to the memory element buses connected to those of said memory elements which correspond to a plurality of logical positions (i, j), (i, j+1), (,+1, J) and (i+1, j+1); and
   a plurality of external switching elements respectively connected to said memory element buses, for inputting/outputting partial image data between an external device and said memory elements,
   wherein an image frame buffer is constructed by said (n+1)×(m+1) memory elements which are adjacent-and continuous to one another, and
   wherein image data obtained by an image pickup device are input to said parallel computer and stored in said image frame buffer by said external switching elements.

19. The parallel computer according to claim 18, in which said processing elements is equal to $(n+1)\times(m+1)$ in number, and which further comprises other internal switching elements for connecting predetermined processing elements included in said processing element buses and associated memory buses included in said memory element buses to form a logical closed loop of said processing element buses and said memory element buses.

20. The parallel computer according to claim 18, wherein each of said processing elements has a function for effecting the image processing in the distributed and cooperative manner based on partial images stored only in associated ones of said memory elements which are directly accessed by said each of said processing elements via corresponding ones of said internal switching elements.

21. The parallel computer according to claim 18, further comprising a global processor which accesses the image data stored in said image memory via said external switching elements and calculating the global feature based on the image data.

* * * * *